US 8,125,942 B2

(12) United States Patent
Horikoshi et al.

(10) Patent No.: US 8,125,942 B2
(45) Date of Patent: Feb. 28, 2012

(54) MIMO WIRELESS COMMUNICATION

(75) Inventors: Hideto Horikoshi, Kanagawa-ken (JP); Kohei Shibata, Fujisawa (JP); Kozo Matsunaga, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 734 days.

(21) Appl. No.: 11/871,962

(22) Filed: Oct. 12, 2007

(65) Prior Publication Data

US 2008/0130599 A1    Jun. 5, 2008

(30) Foreign Application Priority Data

Oct. 12, 2006   (JP) .................. 2006-278504

(51) Int. Cl.
*H04W 4/00* (2009.01)
(52) U.S. Cl. ........................................ 370/328
(58) Field of Classification Search ............ 370/328; 455/277.1, 135, 437, 450, 436; 375/347
See application file for complete search history.

(56) References Cited

U.S. PATENT DOCUMENTS

| | | | | |
|---|---|---|---|---|
| 7,489,652 B2 * | 2/2009 | Kwon et al. | ............ | 370/328 |
| 7,729,325 B2 * | 6/2010 | Gopalakrishnan et al. | ... | 370/338 |
| 2007/0071149 A1 * | 3/2007 | Li et al. | ............ | 375/347 |

FOREIGN PATENT DOCUMENTS

| | | |
|---|---|---|
| JP | 05-327568 | 12/1993 |
| JP | 11-284553 | 10/1999 |
| JP | 2003-283403 | 10/2003 |
| JP | 2004-260338 | 9/2004 |
| JP | 2006-115414 | 4/2006 |

* cited by examiner

*Primary Examiner* — Ricky Ngo
*Assistant Examiner* — Chandrahas Patel
(74) *Attorney, Agent, or Firm* — Ference & Associates LLC

(57) ABSTRACT

There are provided methods and arrangements for communication in which, even in a case where an antenna that is not correctly connected is present in a wireless module provided with a plurality of antennas, high-performance data communication can be performed without using such antennas. RSSI values are detected from a plurality of receiving circuits of a wireless module, respectively, and a computer judges whether or not there is a significant difference between a first RSSI value detected from one receiving circuit and a second RSSI value detected from another receiving circuit. In a case where it is judged that there is the significant difference, the computer recognizes that the receiving circuit from which a larger RSSI value has been detected is connected to an antenna and the receiving circuit from which a smaller RSSI value has been detected is not connected to the antenna, and the receiving circuit recognized to be unconnected to the antenna is set to operation stop.

20 Claims, 9 Drawing Sheets

| CASE | VALID/INVALID OF TRANSMISSION/RECEPTION CIRCUITS | | | TYPE OF WIRELESS MODULE 31 | | | |
|---|---|---|---|---|---|---|---|
| | 51a | 51b | 51c | 1×3 (ONLY 51a TRANSMITTABLE) | 2×3 (51a, 51c TRANSMITTABLE) | 3×3 (ALL THREE TRANSMITTABLE) | |
| 1 | ○ | ○ | ○ | 1×3 | 2×3 | 3×3 | |
| 2 | ○ | ○ | × | 1×2 | 1×2 | 2×2 | |
| 3 | ○ | × | ○ | 1×2 | 2×2 | 2×2 | |
| 4 | ○ | × | × | 1×1 | 1×1 | 1×1 | |
| 5 | × | ○ | ○ | ERROR | 1×2 | 2×2 | |
| 6 | × | ○ | × | ERROR | ERROR | 1×1 | |
| 7 | × | × | ○ | ERROR | 1×1 | 1×1 | |

Fig. 7

MIMO WIRELESS COMMUNICATION

CLAIM FOR PRIORITY

This application claims priority from Japanese Application No. 2006-278504 filed on Oct. 12, 2006 and is fully incorporated by reference as if fully set forth herein.

FIELD OF THE INVENTION

The present invention relates to a technology constituting a MIMO wireless communication system. More particularly, it relates to a technology in which a connection state of a plurality of receiving antennas is judged to dynamically constitute the system.

BACKGROUND OF THE INVENTION

A portable computer such as a notebook-size personal computer (hereinafter referred to as a notebook PC) or a PDA (personal digital assistant) is usually provided with a communicating function with respect to a wireless network, such as a wireless LAN (local area network) module. Moreover, it is demanded that the provided wireless LAN module should cope with an increasingly high-speed communication standard. Heretofore, wireless communication having a transmission speed of 54 Mbps (Megabits per second) at maximum in a physical layer has been put to practical use with the aid of IEEE802.11a/b/g, but especially, an FTTH (fiber to home) having a transmission speed of 100 Mbps or more has spread even to general households, and hence it is demanded that the transmission speed of wireless LAN should also be in excess of 100 Mbps. Therefore, as the wireless LAN having a transmission speed of 100 Mbps or more in an MAC (media access control layer) layer, IEEE802.11n is to be standardized and put to practical use in 2007.

As a central technology which realizes an increase of the transmission speed of this wireless LAN, a space division multiplexing (SDM) transmission technology using a multiple input multiple output (MIMO) is employed in IEEE802.11n. In this technology, a plurality of antennas are installed on transmission and reception sides, respectively, and transmission data is divided by the number of the antennas, modulated at an equal frequency, and simultaneously transmitted in parallel. In consequence, a capacity of the simultaneously transmittable data can be increased. However, signals transmitted from the respective transmission-side antennas are influenced by reflection and decay of a transmission path, and hence signals received from the respective reception-side antennas are strained and these strained signals are synthesized. Therefore, the strain of the received signals needs to be estimated to restore the transmission signals. FIG. 11 is a conceptual diagram of the SDM technology using the MIMO. A transmission station 601 includes M antennas, and a reception station 603 includes N antennas, respectively. The transmission station 601 divides input information into M information channels by serial-parallel conversion, and transmits these pieces of the information from the respective antennas. The pieces of the information transmitted from the M antennas of the transmission station 601 reach the N antennas of the reception station 603, respectively. Between the stations, M×N MIMO channels or propagation paths referred to as a multipath are present. Furthermore, they include strain components due to reflection, decay and the like, respectively. Assuming that the signals transmitted from the respective antennas of the transmission station 601 are t1 to tm (transmission signal vectors) and the signals received by the antennas of the reception station 603 are r1 to m (reception signal vectors) in an equation 605, a transmission function can be obtained from a pilot signal and a preamble signal to estimate the transmission signals from the received signals.

On the other hand, an orthogonal frequency division multiplexing (OFDM) is a multicarrier communication system which multiplexes signals with a plurality of sub-carriers, and a sub-carrier interval is regarded as an inverse number of a signal period so that the sub-carriers are independently separable. FIG. 12 is a conceptual diagram of an OFDM technology. In the OFDM, a guard zone (GT) 613 obtained by copying a part of a symbol 611 is added before each symbol. On a reception side, a signal in which a direct coming wave 615 is mixed with a delay wave 617 due to the reflection or the like is received. However, owing to the presence of the GT 613, a demodulation zone of the symbol 611 included in the direct coming wave 615 is not influenced by the symbols before and after the symbol 611 included in the delay wave 617. In consequence, the influence of the delay wave can be reduced to perform demodulation. Furthermore, since the influence of the delay wave is reduced, an equation to estimate the transmission signal from the received signal according to the MIMO can be simplified. Therefore, the OFDM has high affinity with the MIMO, and a MIMO-OFDM in which both of the MIMO and the OFDM are combined is expected as a nucleus of a mobile body communication technology of the next generation.

As a technology in which a wireless terminal provided with a plurality of antennas using the MIMO and receiving sections corresponding to the respective antennas selects the receiving section to be used, Masahiro et al. (Japanese Unexamined Patent Publication No. 2006-115414) (hereinafter "Masahiro") teaches a technology in which a frame sent from a base station is analyzed to select the receiving section. As a technology in which the antenna to be used is simply selected from the plurality of antennas, Satoru et al. (Japanese Unexamined Patent Publication No. 2004-260338) (hereinafter "Satoru") teaches a technology to select a reception system having a large received signal level. Kohiya et al., *Wireless Broadband Textbook*, Tokyo Denki University Publication Bureau (2006) and Morikura et al. (editors), *Revised Version 802.11 High-Speed Wireless LAN Textbook*, Impress (2005) describe the basics of MIMO and OFDM technologies. Deguchi et al., *Key Technology of Portable Terminal in Next-Generation Mobile Communication System*, Toshiba Review Vol. 60, No. 9, Toshiba Corp. (2005) describes a technology to reduce a processing amount in a MIMO-OFDM system.

While the above systems and methods allow for wireless communications, a need has arisen for increasing the ease and flexibility of employing such wireless communications as well as addressing other shortcomings of the above described systems and methods.

SUMMARY OF THE INVENTION

There are broadly contemplated herein, in accordance with at least one presently preferred embodiment of the present invention, new methods and apparatus for MIMO wireless communication.

One aspect of the present invention provides a method comprising: in a MIMO wireless communication system, detecting a plurality of received signal strength indicator values from a plurality of receiving circuits; and determining if there is a difference between the plurality of received signal strength indicator values from the plurality of receiving circuits; wherein if the difference is determined, the system recognizes that a receiving circuit from which a larger received signal strength indicator value has been detected is connected to at least one of a plurality of antennas and a receiving circuit from which a smaller received signal strength indicator value has been detected is not connected to at least one of the plurality of antennas and sets to operation stop the receiving circuit recognized to be unconnected to the at least one of a plurality of antennas.

Another aspect of the present invention provides an apparatus comprising: a plurality of antennas; a MIMO wireless communication module, including a plurality of receiving circuits, configured to be connected to the plurality of antennas and configured to detect a plurality of received signal strength indicator values from a plurality of receiving circuits; an arrangement configured to determine if there is a difference between the plurality of received signal strength indicator values from the plurality of receiving circuits; and an arrangement configured to recognize that a receiving circuit from which a larger received signal strength indicator value has been detected is connected to at least one of a plurality of antennas and a receiving circuit from which a smaller received signal strength indicator value has been detected is not connected to at least one of the plurality of antennas, and set to operation stop the receiving circuit recognized to be unconnected to the at least one of a plurality of antennas.

A further aspect of the present invention provides an apparatus comprising: a storage device in which a communication program and a reference received signal strength indicator value are stored; a plurality of antennas; a MIMO wireless communication system including a plurality of receiving circuits configured to be connected to the plurality of antennas via a connector, and configured to detect received signal strength indicator values from the receiving circuits; and a processor which executes the communication program and which judges whether there is a significant difference between the received signal strength indicator values detected from the plurality of receiving circuits to recognize the receiving circuit which is not connected to the antenna and set the recognized receiving circuit to operation stop.

An additional aspect of the present invention provides A program storage device readable by machine, tangibly embodying a program of instructions executable by the machine to perform method steps, the method steps comprising the steps of: in a MIMO wireless communication system, detecting a plurality of received signal strength indicator values from a plurality of receiving circuits; and determining if there is a difference between the plurality of received signal strength indicator values from the plurality of receiving circuits; wherein if the difference is determined, the system recognizes that a receiving circuit from which a larger received signal strength indicator value has been detected is connected to at least one of a plurality of antennas and a receiving circuit from which a smaller received signal strength indicator value has been detected is not connected to at least one of the plurality of antennas and sets to operation stop the receiving circuit recognized to be unconnected to the at least one of a plurality of antennas.

BRIEF DESCRIPTION OF THE DRAWINGS

FIG. 7 is a table showing a setting of the wireless module in Cases 1 to 7 judged according to the flow chart of FIG. 5;

DETAILED DESCRIPTION OF THE INVENTION

Figure 1:
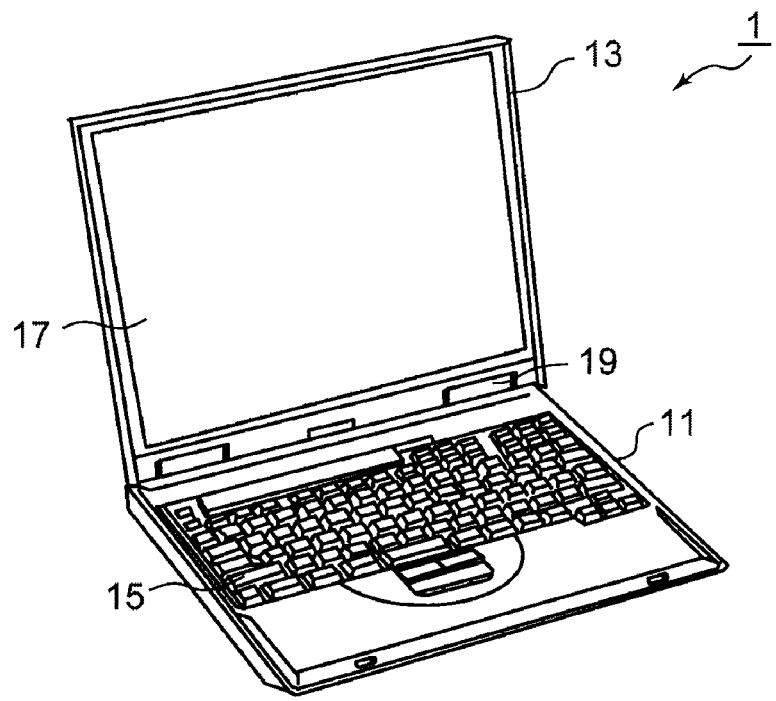
FIG. 1 is an external view of a notebook PC according to one embodiment of the present invention.

For a better understanding of the present invention, together with other and further features and advantages thereof, reference is made to the following description, taken in conjunction with the accompanying figures, and the scope of the invention will be pointed out in the appended claims.

It will be readily understood that the components of the present invention, as generally described and illustrated in the figures herein, may be arranged and designed in a wide variety of different configurations. Thus, the following more detailed description of the embodiments of the system and methods of the present invention, as represented in the figures, is not intended to limit the scope of the invention claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" (or the like) in various places throughout this specification are not necessarily referring to the same embodiment.

Furthermore, the described features, structures, or characteristics may be combined in any suitable manner in one or more embodiments. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will best be understood by reference to the figures, wherein like parts are designated by like numerals or other labels throughout. The following description is intended only by way of example, and simply illustrates certain selected embodiments of devices, systems, and processes that are consistent with the invention as claimed.

The disclosure will now provide an overview of the invention before providing a more detailed description of the invention with reference to the figures.

In a MIMO wireless communication system, for example, two antennas of a transmitting section× two antennas of a receiving section, or two antennas of the transmitting section× three antennas of the receiving section are used, and the arbitrary number of the antennas are used on a reception side in this manner. Therefore, a certain notebook PC requires a wireless module for two antennas, and another notebook PC sometimes requires a wireless module for three antennas. In addition, if at least about five types of wireless modules are not prepared for one model, the wireless modules cannot cope with regulations on an output of a wireless wave and a frequency band which differ with countries. If the wireless module for two antennas is prepared separately from the wireless module for three antennas, costs are increased, and additionally control of components for replacement becomes laborious. Therefore, it is preferable that one MIMO wireless module serves as the module for two antennas as well as the module for three antennas.

Moreover, the wireless module is incorporated in the notebook PC on a main body side, whereas the antennas are incorporated around a display in many cases so as to obtain more satisfactory transmission and reception characteristics. Therefore, the wireless module needs to be connected to a signal line from the antenna via a connector by an assembling factory or a user. However, in a case where two antennas are to be connected to the wireless module in which three antenna ports are prepared, it is difficult for the user to correctly judge the antenna port to be connected with an only appearance of the wireless module, and hence a situation in which the antenna is not connected to the correct antenna port is generated. If communication is performed using the MIMO wireless module that is not correctly connected to the antenna, transmission and reception performances are deteriorated. Furthermore, even if the antenna is connected via the connector, the electric connection is sometimes incomplete. For example, in a case where one of the three antennas has a connection defect and the wireless module for three antennas is set to perform the communication, the transmission and reception performances deteriorate as compared with a case where the wireless module for two antennas is set to perform the communication. Therefore, the number and the ports of the correctly connected antennas need to be recognized, and an operation of the wireless module needs to be set so as to cope with the antennas.

To detect whether or not the plurality of antennas are correctly connected to the antenna ports of the wireless module, respectively, a method is proposed in which the antennas themselves are provided with device IDs (identifications) and the wireless module detects the device IDs. However, for this purpose, circuits to hold and transmit ID information need to be added to the respective antennas. This is not a realistic method because increases in the cost and installation space are incurred. Furthermore, it is expected that the number of the antennas for use in the MIMO will increase. Therefore, it is preferable that a method of setting one wireless module to an operation mode corresponding to a plurality of antennas and a method of setting the wireless module by use of the only correctly connected antenna can cope with the arbitrary number of the antennas without increasing the cost.

Therefore, the present invention provides a method of detecting an effectively connected antenna to set an operation of a MIMO wireless communication system in a computer on which the MIMO wireless communication system, including receiving circuits configured to be connected to a plurality of antennas, is mounted. The present invention provides a method of dynamically detecting a connected situation of the antenna in such a computer to set the operation of the MIMO wireless communication system. The present invention provides a computer that realizes such a method, a computer program and a storage medium in which the computer program is stored.

In the present invention, a received signal strength indicator value (hereinafter referred to as the RSSI value, RSSI is an abbreviation of a "received signal strength indicator" or a "received signal strength indication") to be output from the antenna to the receiving circuit is used. The RSSI value is detected by the receiving circuit of the MIMO communication system, and the measurement result is output to a processor of the computer. There is a difference between the detected RSSI values in a case where the receiving circuit is connected to the antenna and a case where the circuit is not connected to the antenna. The RSSI value detected from the receiving circuit decreases as the distance from an access point increases. Therefore, in a case where the computer compares the RSSI values detected by the plurality of receiving circuits with one another to judge whether or not there is a significant difference, even if the distance from the access point changes, it is possible to correctly recognize whether or not the antennas are correctly connected to the receiving circuits.

According to the present invention, there is provided a method of setting an operation of a wireless module in a computer, on which a MIMO wireless communication system (including a plurality of receiving circuits configured to be connected to antennas) is mounted. In this method, the computer detects RSSI values from the plurality of receiving circuits, respectively, and judges whether or not there is a significant difference between a first RSSI value detected from one receiving circuit and a second RSSI value detected from another receiving circuit. When there is a significant difference, one receiving circuit is connected to the antenna and the other receiving circuit is not connected to the antenna. When there is not a significant difference, both the receiving circuits are connected or unconnected to the antennas. When it is judged that there is a significant difference, the computer recognizes that the receiving circuit, from which a larger RSSI value has been detected, is connected to the antenna and that the other receiving circuit, from which a smaller RSSI value has been detected, is not connected to the antenna. The computer sets, to operation stop, the receiving circuit recognized to be unconnected to the antenna.

A reference RSSI value is beforehand measured and calculated in a factory, an experimental laboratory or the like, and stored in the computer beforehand. In the present invention, this reference RSSI value is compared with a difference between the detected first RSSI value and the detected second RSSI value to judge whether or not there is a significant difference between the first RSSI value and the second RSSI value. As described above, there is a difference between the detected RSSI values in a case where the receiving circuit is connected to the antenna and a case where the circuit is not connected to the antenna. Therefore, assuming that a representative value of the RSSI values detected a plurality of times from one receiving circuit connected to the antenna is A, a representative value of the RSSI values detected a plurality of times from the other receiving circuit connected to the antenna is B and a representative value of the RSSI values detected a plurality of times from the other receiving circuit which is not connected to the antenna is C, the reference RSSI value is set to be larger than a representative value of a difference between A and B and smaller than a representative value of a difference between A and C. It is to be noted that the plurality of times of the detection of the RSSI values for obtaining the representative values A, B and C are performed by measuring the values at measurement positions of a plurality of distances from an access point or by measuring the values at the respective measurement positions a plurality of times for a predetermined time. The representative value mentioned herein may be an average value, a maximum value or a minimum value selected from the plurality of RSSI values, or a value such as a median subjected to statistical processing.

A step of judging whether or not there is a significant difference between the representative RSSI value (detected from one receiving circuit of a group consisting of a plurality of receiving circuits from which the RSSI values that do not have any significant difference there between have been detected) and a target RSSI value (detected from the receiving circuit which is not included in this group) is repeated. In consequence, the computer can recognize the antenna port which is connected or unconnected to the antenna, even if this wireless communication system copes with many antennas. In this case, when there is a significant difference between the representative RSSI value and the target RSSI value, and the representative RSSI value is large, it can be judged that all the receiving circuits included in this group are connected to the antennas. When the target RSSI value is large, it can be judged that all the receiving circuits included in this group are not connected to the antennas. When there is not any significant difference between the representative RSSI value and the target RSSI value, it can be judged that the receiving circuit from which the target RSSI value has been detected is included in the group.

The present invention provides a method of setting an operation of a MIMO wireless communication system in a computer on which the MIMO wireless communication system, including three receiving circuits of first to third receiving circuits configured to be connected to antennas, respectively, is mounted. In this method, the wireless communication system detects RSSI values from the first to third receiving circuits, respectively, and the computer compares the RSSI values with one another, and evaluates a result of the comparison by use of a reference RSSI value to recognize the receiving circuit connected to the antenna and the receiving circuit which is not connected to the antenna. The receiving circuit recognized to be unconnected to the antenna is set to operation stop.

As described above, there is a difference of about several ten dB between the detected RSSI values in a case where the antenna is connected to the receiving circuit and a case where the antenna is not connected. Therefore, assuming that a representative value of the RSSI values detected a plurality of times from one receiving circuit connected to the antenna is A, a representative value of the RSSI values detected a plurality of times from the other receiving circuit connected to the antenna is B and a representative value of the RSSI values detected a plurality of times from the other receiving circuit which is not connected to the antenna is C, the reference RSSI value can be obtained as a value of ½ of total of a maximum value of a difference between A and B and a minimum value of a difference between A and C.

Here, the difference between A and B and the difference between A and C mean absolute values. The maximum value of the difference between A and B means that in a case where a difference between two actually measured RSSI values is larger than the maximum value, it may be judged that one receiving circuit is connected to the antenna and that the other receiving circuit is not connected to the antenna. The minimum value of the difference between A and C means that in a case where the difference between two actually measured RSSI values is smaller than the minimum value, it may be judged that all the receiving circuits are connected or unconnected to the antennas. However, since communication conditions at a time when the value is measured in the experimental laboratory are different from those in an actual use environment, it is predicted that it is not sufficient to use the difference between A and B and the difference between A and C in the reference RSSI value. In the present invention, to calculate the reference RSSI value, the value is set to ½ of the total of the maximum value of the difference between A and B and the minimum value of the difference between A and C to minimize a probability of wrong judgment.

When the absolute value of the difference between the first RSSI value detected from the first receiving circuit and the second RSSI value detected from the second receiving circuit is larger than the reference RSSI value, the computer can recognize that the receiving circuit from which a larger RSSI value of the first RSSI value and the second RSSI value has been detected is connected to the antenna. When the absolute value of the difference between the larger RSSI value and a third RSSI value detected from the third receiving circuit is smaller than the reference RSSI value, the computer can recognize that the receiving circuit from which the larger RSSI value has been detected and the third receiving circuit are connected to the antennas.

When the absolute value of the difference between the first RSSI value and the second RSSI value is smaller than the reference RSSI value, an absolute value of a difference between the first RSSI value or the second RSSI value and the third RSSI value is compared with the reference RSSI value. Moreover, when the absolute value of the difference between the first RSSI value or the second RSSI value and the third RSSI value is larger than the reference RSSI value and the first RSSI value or the second RSSI value is smaller than the third RSSI value, it can be recognized that the third receiving circuit is connected to the antenna. When the absolute value of the difference between the first RSSI value or the second RSSI value and the third RSSI value is smaller than the reference RSSI value, on the presumption that one antenna port is securely connected to the antenna, it can be recognized that all the first to third receiving circuits are connected to the antennas, respectively.

The present invention also provides a computer configured to perform wireless communication. This computer has a plurality of antennas, and MIMO wireless communication arrangement or device including a plurality of receiving circuits configured to be connected to the plurality of antennas, respectively, and configured to detect RSSI values from the respective receiving circuits. Moreover, the computer includes a judgment arrangement or device for judging whether or not there is a significant difference between a first RSSI value detected from one receiving circuit and a second RSSI value detected from the other receiving circuit, and an arrangement which recognizes that the receiving circuit from which a larger RSSI value has been detected is connected to the antenna and that the receiving circuit from which a smaller RSSI value has been detected is not connected to the antenna, and setting the recognized receiving circuits to operation stop, when the judgment arrangement judges that there is the significant difference. It can be assumed that this wireless communication arrangement conforms to IEEE802.11n. It is assumed that the judgment arrangement compares a difference between the first RSSI value and the second RSSI value with a reference RSSI value measured beforehand to judge whether or not there is the significant difference.

Moreover, the present invention provides a computer configured to perform wireless communication that includes a storage device in which a communication program and a reference RSSI value are stored; a plurality of antennas; a MIMO wireless communication system including a plurality of receiving circuits configured to be connected to the plurality of antennas via a connector, respectively, and configured to detect RSSI values from the respective receiving circuits; and a processor. The processor executes the communication program stored in the storage device, and judges whether or not there is a significant difference between the RSSI values detected from the plurality of receiving circuits, respectively, to recognize the receiving circuit which is not connected to the antenna and set the recognized receiving circuit to operation stop. This communication program can be executed before the computer starts the wireless communication for each connecting operation of the wireless communication. As a result, even when a connected situation of the antenna cannot correctly be recognized and the wireless communication system cannot correctly be set in a peculiar wireless wave situation, this state is not fixed, and the connected situation can correctly be recognized before the next wireless communication starts. Furthermore, according to the present invention, there can be provided a computer program that realizes the above-mentioned method or device, and a storage medium in which the computer program is stored.

The present invention also provides a method of detecting an effectively connected antenna to set an operation of a MIMO wireless communication system in a computer on which the MIMO wireless communication system, including a plurality of receiving circuits configured to be connected to the antennas, is mounted. According to the present invention, it is possible to provide a method of dynamically detecting a connected situation of an antenna to set an operation of a MIMO wireless communication system in such a computer. Moreover, according to the present invention, it is possible to provide a computer that realizes such a method, a computer program and a storage medium in which the computer program is stored.

The disclosure now turns to a description of the preferred embodiments of the present invention with reference to the drawings. While the following description focuses on the invention as embodied in a notebook computer, it will be readily understood by one having ordinary skill in the art that the invention may be embodied in any like device where such wireless communication is desirable.

FIG. 1 is an external view of a notebook-size personal computer (hereinafter referred to as the notebook PC) 1 according to one embodiment of the present invention. The notebook PC 1 includes a main body housing 11 and a display housing 13 both having a substantially rectangular parallelepiped shape. The main body housing 11 includes an input section 15 provided with a keyboard and a pointing device, and the display housing 13 is provided with a display 17. Furthermore, end portions of the main body housing 11 and the display housing 13 are connected to each other via a connecting portion 19, and these housings are rotatable in a mutually opening or closing direction. When the main body housing 11 and the display housing 13 are closed, the input section 15 and the display 17 are incorporated internally, and covered. Moreover, three antennas to be connected to a wireless network (wireless LAN or the like) are incorporated in an outer edge of the display housing 13.

Figure 2:
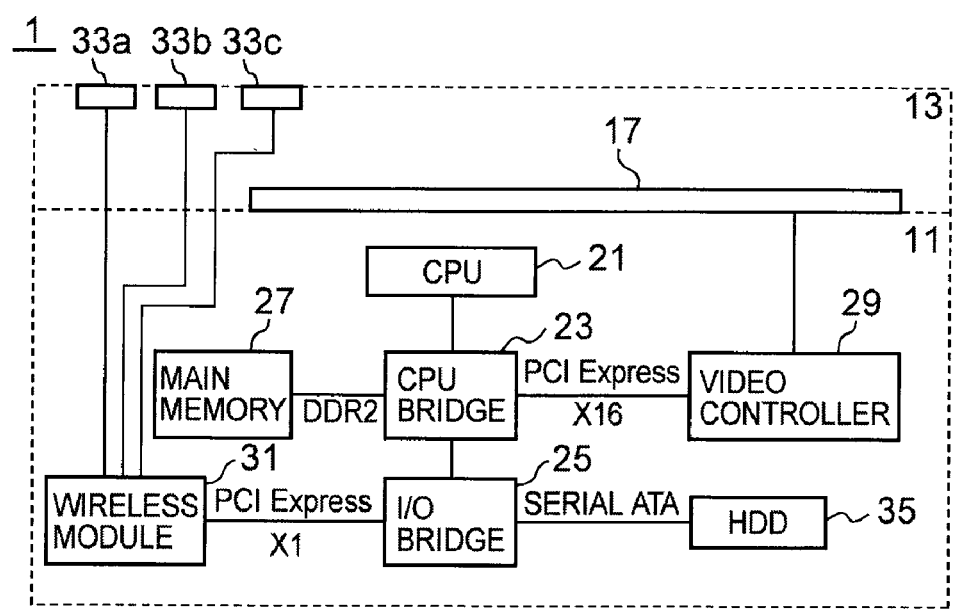
FIG. 2 is a schematic diagram showing a configuration of hardware of the notebook PC according to one embodiment of the present invention.

FIG. 2 is a schematic diagram showing a configuration of hardware incorporated in the notebook PC 1. A CPU (central processing unit) 21 is a computing device having a central function of the notebook PC, and executes an OS (operating system), a BIOS (basic input output system), a device driver, an application program or the like. The CPU 21 is connected to a chip set mainly including a CPU bridge 23 and an I/O (input/output) bridge 25, and controls devices constituting the notebook PC 1. The CPU bridge 23 includes a memory controller function of controlling an operation to access a main memory 27, a data buffer function of absorbing a data transfer speed difference between the CPU 21 and another device and the like. The main memory 27 is connected to the CPU 21 via a double data rate 2 (DDR2) bus, and is a writable memory for use as a reading area of a program to be executed by the CPU 21 or an operation area in which processing data is written. A video controller 29 is connected to the CPU 21 via a PCI express X16 bus, has a video chip and a VRAM (Volatile Random Access Memory) (both are not shown), receives a drawing command from the CPU 21 to generate an image to be drawn and write the image in the VRAM, and sends the image read from the VRAM as drawing data to a display 17 included in the display housing 13.

A wireless module 31 is connected to the I/O bridge 25 via a PCI express X1 bus, and performs data communication with the wireless network by a MIMO-OFDM via three antennas 33a, 33b and 33c included in the display housing 13. The I/O bridge 25 also includes functions of a serial ATA interface and a USB interface (not shown), and is connected to a hard disk drive (HDD) 35, an optical drive (not shown) and the like via serial ATA (advanced technology attachment). An operating system (hereinafter referred to as the OS) and the device driver are installed in the HDD 35. Furthermore, the I/O bridge 25 is connected to a legacy device (not shown) which is a device conforming to an old standard heretofore used in the notebook PC, or a device (not shown) which does not require high-speed data transfer via a PCI bus or an LPC bus (neither is shown).

Figure 3:
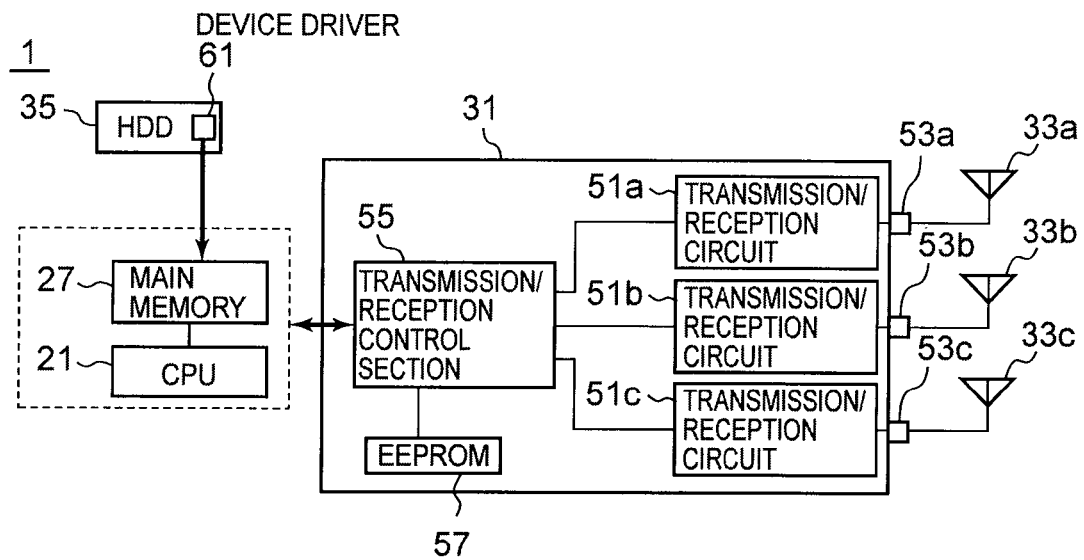
FIG. 3 is a schematic block diagram showing configurations of a wireless module, three antennas and a peripheral of the notebook PC according to one embodiment of the present invention.

FIG. 3 is a schematic block diagram showing configurations of the wireless module 31 and the three antennas 33a, 33b and 33c constituting the present embodiment, and peripherals. The wireless module 31 mainly includes transmission/reception circuits 51a, 51b and 51c corresponding to the three antennas 33a, 33b and 33c, a transmission/reception control section 55 which controls the circuits, and an EEPROM (electrically erasable programmable read only memory) 57 in which setting information on communication is stored. The three antennas 33a, 33b and 33c are connected to the transmission/reception circuits 51a, 51b and 51c via connectors 53a, 53b and 53c, respectively. Moreover, the transmission/reception control section 55 also performs a function of distributing transmission information to channels of the transmission/reception circuits 51a, 51b and 51c, respectively, and a function of separating information of the channels from output signals received by the transmission/reception circuits 51a, 51b and 51c to decode the information. The CPU 21 can set whether to individually validate or invalidate the transmission/reception circuits 51a, 51b and 51c in accordance with a connection state of the antennas. Hereinafter, it is assumed in the transmission/reception control section 55 that an operation mode to use only one antenna is a "one-antenna mode", an operation mode to use two antennas is a "two-antenna mode" and an operation mode to use three antennas is a "three-antenna mode". As a part of the transmission/reception circuits 51a, 51b and 51c, a circuit that can only receive the information but cannot transmit any information may be present. However, in the present invention, the number of the receiving circuits and the number of the antennas effectively connected to the receiving circuits are targeted. Therefore, even a circuit for exclusive use in reception may be replaced with the transmission/reception circuit.

Since the wireless module 31 can be connected to three antennas at maximum, an operation state by the three-antenna mode is stored as a default setting in the EEPROM 57. Immediately after a power supply is turned on, the wireless module 31 reads data from the EEPROM 57 to set itself to the three-antenna mode irrespective of an actual connection state of the antennas. A program that controls the wireless module 31 is installed as a device driver 61 in the HDD 35. When the notebook PC 1 is started, the program is read together with the OS into the main memory 27, and executed by the CPU 21. The device driver 61 stores the setting information of the wireless module 31 as a part of a registry of the OS. When the OS is started in the notebook PC 1, the wireless module 31 is set based on contents stored in the registry. The device driver 61 can receive RSSI values of received wireless waves detected by the respective transmission/reception circuits 51a, 51b and 51c through the transmission/reception control section 55.

It is to be noted that to describe the present embodiment, FIGS. 1 to 3 merely show a simplified configuration and connecting relation of main hardware (partially including software) concerned with the present embodiment. In addition to the above description, many devices are used in constituting the notebook PC 1, but they are well known to a person skilled in the art, and hence detailed description thereof is omitted here. A configuration in which a plurality of blocks shown in the drawing are integrated as one integrated circuit or device, and a configuration in which conversely one block is divided into a plurality of integrated circuits or devices are included in the scope of the present invention as long as the configuration can arbitrarily be selected by the person skilled in the art. A type of the bus, the interface or the like which connects the devices to one another is merely one example, and another connection is included in the scope of the present invention as long as the connection can arbitrarily be selected by the person skilled in the art.

Figure 4:
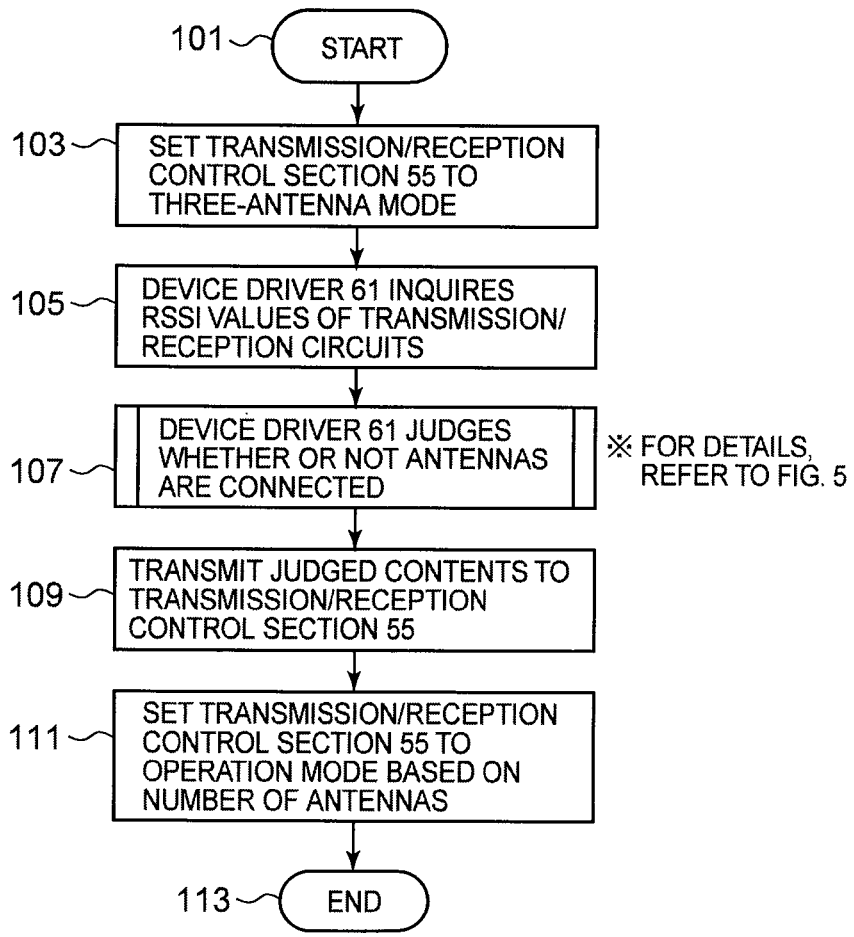
FIG. 4 is a flow chart showing an operation of determining whether or not to use the three antennas in communication of the notebook PC according to one embodiment of the present invention.

FIG. 4 is a flow chart showing a procedure of judging the connection state of the three antennas 33a, 33b and 33c shown in FIG. 3 to set the operation mode of the wireless module 31 according to the present embodiment. FIG. 3 shows that the three antennas are connected, but in the flow chart of FIG. 4, it is judged whether or not these antennas are electrically effectively connected. The CPU 21 executes the device driver 61 to perform the procedure of FIG. 4. When the notebook PC 1 is started (block 101), first, according to default setting information stored in the EEPROM 57, the transmission/reception control section 55 sets itself to the three-antenna mode (block 103). In the wireless module 31, the transmission/reception circuits 51a, 51b and 51c detect the RSSI value from a preamble of a data signal sent from an access point. Subsequently, when the OS and the device driver 61 are started, the device driver 61 inquires, of the transmission/reception circuits 51a, 51b and 51c, the RSSI values detected at this time (block 105). Furthermore, the device driver 61 judges, based on the RSSI values inquired and obtained from the respective transmission/reception circuits, whether or not the three antennas 33a, 33b and 33c are effectively connected (block 107), transmits judged contents to the transmission/reception control section 55 (block 109).

The transmission/reception control section 55 sets the transmission/reception circuit judged to be unconnected to the antenna to be invalid based on the contents transmitted from the device driver 61 with respect to the transmission/reception circuits 51a, 51b and 51c. In consequence, the three transmission/reception circuits are set to be valid or invalid based on the connection state of the antennas. Moreover, the transmission/reception control section 55 sets an operation mode of MIMO signal processing such as signal separation or decoding in accordance with the number of the antennas for use (block 111). In consequence, the setting of the operation mode of the wireless module 31 ends (block 113). Subsequently, the wireless module 31 sends an association request to the access point. After association is established, the module starts the data communication. It is to be noted that the procedure shown in FIG. 4 is performed for each association before the wireless communication is started. Therefore, if connected situations of the antennas are judged by mistake to wrongly set the operation mode of the wireless module 31, the connected situations of the antennas are judged again before the next association to correct the mistake.

Figure 5:
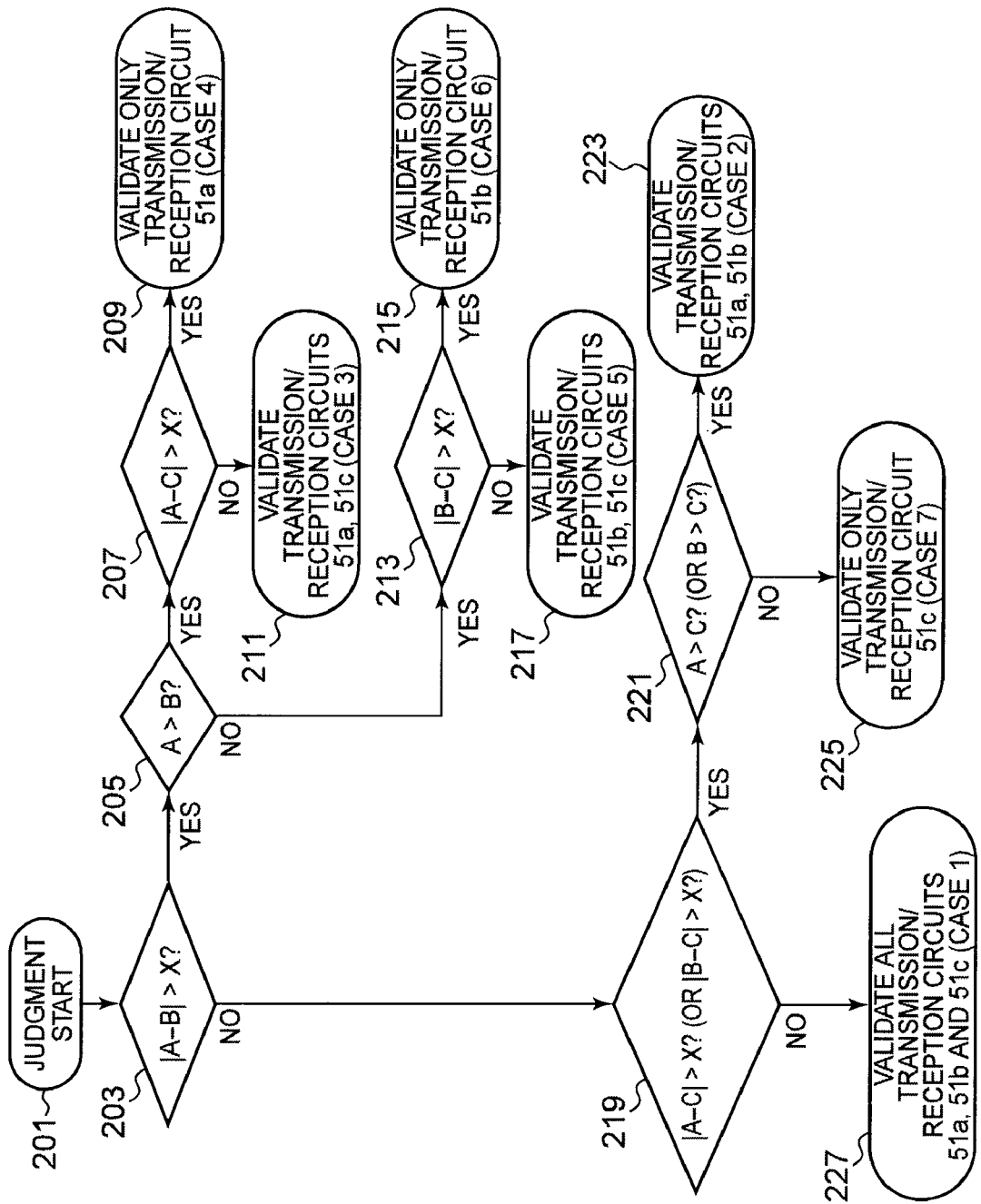
FIG. 5 is a flow chart showing judgment to determine whether or not to use the three antennas in the communication of the notebook PC according to one embodiment of the present invention in more detail.

FIG. 5 is a flow chart showing a procedure of judging whether or not the three antennas 33a, 33b and 33c are connected to the transmission/reception circuits 51a, 51b 51c as shown in the block 107 of FIG. 4 according to one embodiment. Case 1 to Case 7, shown in FIG. 5, will be described later with reference to FIG. 7. It is unclear whether or not the notebook PC 1 is effectively connected to the antennas 33a, 33b and 33c. The CPU 21 executes the device driver 61 to acquire the RSSI values from the respective transmission/reception circuits 51a, 51b and 51c (block 201). In the following description, it is assumed that the RSSI values measured with the three transmission/reception circuits 51a, 51b and 51c are A, B and C, respectively. It is to be noted that the RSSI value can described in a plurality of types of units such as dB, mV and V/m, but the mV unit is used here.

Figure 6A:
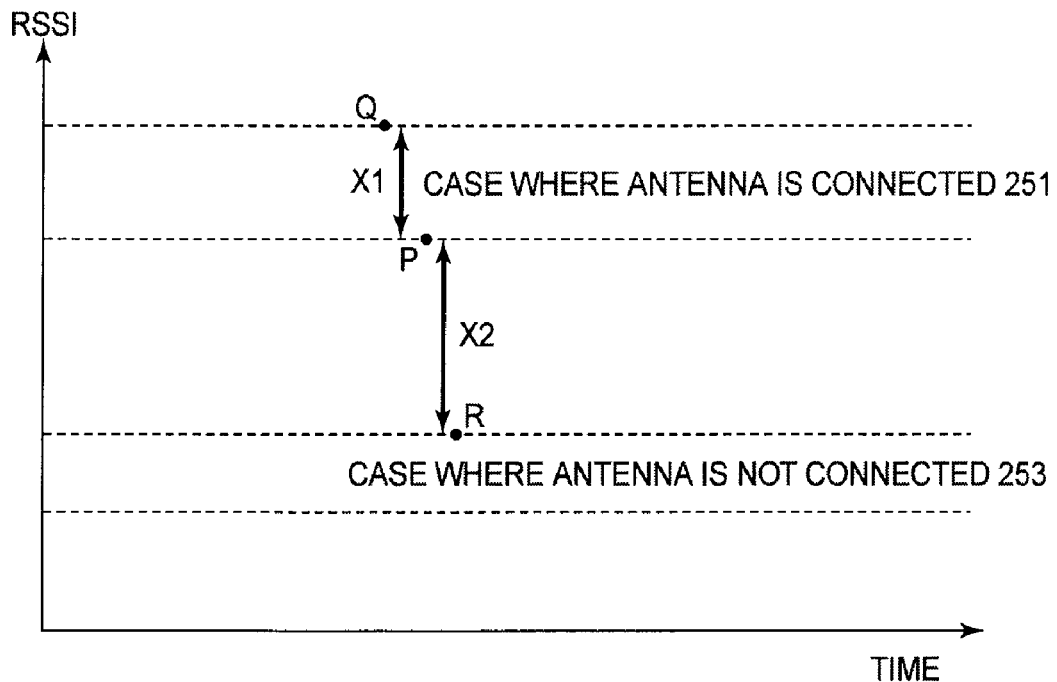
FIG. 6 is a conceptual diagram showing a method of obtaining a reference RSSI value of the notebook PC according to one embodiment of the present invention.

FIG. 6 is a conceptual diagram showing a method of obtaining, in an experimental laboratory, a reference RSSI value as a reference for use in judgment of whether or not the antenna is connected according to one embodiment. FIG. 6A shows a state in which the RSSI values are measured a plurality of times in a case where the receiving circuit is connected to the antenna and a case where the circuit is not connected to the antenna. The RSSI values detected by the transmission/reception circuits are synthesized values of a direct wave received by the corresponding antenna and a multiple path. However, magnitudes of the direct wave and the multiple path fluctuate in accordance with a distance from a transmission antenna to a reception antenna. Even if the antennas have an equal distance, the magnitudes fluctuate with an elapse of time. Even when the transmission/reception circuit is not connected to the antenna, the RSSI value is detected. To obtain the reference RSSI value, in one embodiment, a distance to an access point is varied to set a plurality of measurement positions. Alternatively, the values are measured a plurality of times at one measurement position for a certain time to detect a plurality of RSSI values from the respective antennas.

In FIG. 6A a range of the fluctuation, with the elapse of time, of the RSSI value detected from the transmission/reception circuit connected to the antenna, at a place having a constant distance from the access point in the experimental laboratory, is denoted with reference numeral 251, and a range of the fluctuation of the RSSI value with the elapse of time in a case where the antenna is not connected is denoted with reference numeral 253. Here, it is assumed that the RSSI value detected from one receiving circuit connected to the antenna is a lower limit P of a range 251, the RSSI value detected from another receiving circuit connected to the antenna is an upper limit Q of the range 251, and the RSSI value detected from another receiving circuit which is not connected to the antenna is an upper limit R of a range 253. When P indicates the minimum RSSI value in the range 251 and Q indicates the maximum RSSI value in the range 251, a difference between Q and P is maximized and assumed as X1. In this case, it can be supposed that in an actual use state of the notebook PC 1, an absolute value of a difference between the RSSI values detected from two arbitrary receiving circuits connected to the antennas, respectively, is not larger than X1. When P indicates the minimum RSSI value in the range 251 and R indicates the maximum RSSI value in the range 253, a difference between P and R is minimized and assumed as X2. In this case it can be supposed that in the actual use state of the notebook PC 1, the absolute value of the difference between the RSSI value detected from the receiving circuit connected to the antenna and the RSSI value detected from the receiving circuit which is not connected to the antenna is not smaller than X2. It is to be noted that FIG. 6A shows a measurement result in a case where the distance from the access point is constant. However, in actuality, the RSSI value largely differs with a factor such as a distance between a transmission side and a reception side. Therefore, it is not appropriate to judge whether or not the receiving circuit from which the RSSI value has been detected is connected to the antenna by judging whether or not the absolute value of the RSSI value is a certain threshold value or more.

Figure 6B:
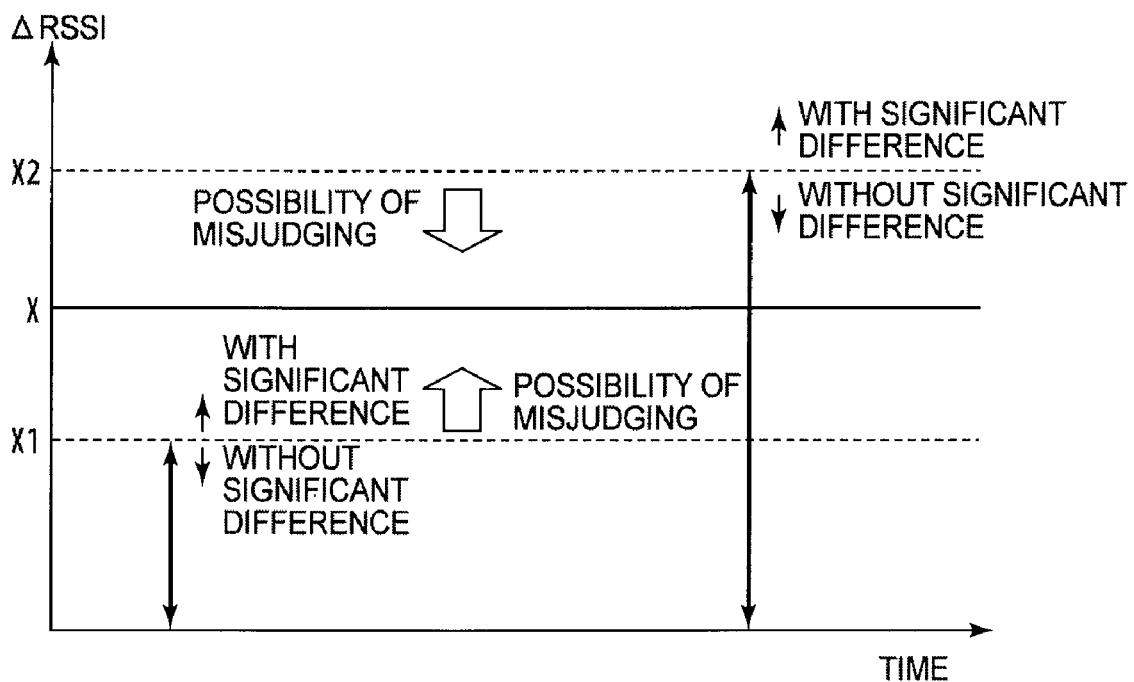

FIG. 6B is an explanatory view of a method of setting the threshold value to judge whether or not there is a significant difference between the RSSI values detected by two arbitrary receiving circuits. When there is a significant difference between the RSSI values detected by the two arbitrary receiving circuits, it is meant that one receiving circuit is connected to the antenna and the other receiving circuit is not connected to the antenna. When there is not any significant difference between the RSSI values detected by the two arbitrary receiving circuits, it is meant that both the receiving circuits are connected or unconnected to the antennas. It can be judged, using the maximum value X1 of the difference between Q and P detected in the experimental laboratory as the threshold value, that there is the significant difference in a case where the absolute value of the difference between the RSSI values detected by two arbitrary receiving circuits is larger than X1 and that there is not any significant difference in a case where the absolute value is smaller. Alternatively, it can be judged, using the minimum value X2 of the difference between P and R detected in the experimental laboratory as the threshold value, that there is the significant difference in a case where the absolute value of the difference between the RSSI values detected by two arbitrary receiving circuits is larger than X2 and that there is not any significant difference in a case where the absolute value is smaller. However, it is predicted that X1 or X2 obtained based on the RSSI value detected in an experimental laboratory environment does not completely cover an actual use environment of the notebook PC. That is, in the actual use environment, even when the absolute value of the difference between the RSSI values detected by two arbitrary receiving circuits is larger than X1, both the receiving circuits might be connected to the antennas. Alternatively, when the absolute value is smaller than X2, only one of the receiving circuits might be connected to the antenna. In other words, the judgment with only X1 has a risk that the RSSI value larger than X1 is misjudged. The judgment with only X2 has a risk that the RSSI value smaller than X2 is misjudged.

To solve the above described problem, in one embodiment, the reference RSSI value is calculated by equation X=(X1+X2)/2, and set to an intermediate value between X1 and X2. In consequence, a mistake risk that it is judged that there is not any significant difference in a case where the absolute value of the difference between the RSSI values is larger than X1, and a mistake risk that it is judged that there is the significant difference in a case where the absolute value is smaller than X2, are reduced with satisfactory balance. It is to be noted that X1 and X2 have the unit of mV here. However, if it is known that there is a strong tendency of the misjudging on one side, owing to a characteristic of the wireless module, the reference RSSI value does not have to be set to the intermediate value between X1 and X2, and can be set in the ranges of X1 and X2. A reference RSSI value X decreases as the notebook PC 1 comes away from the access point. Therefore, it is preferable that conditions such as the distance from the access point to the notebook PC 1 and an obstacle are variously set to calculate X1 and X2 a plurality of times and that X obtained on the respective conditions is statistically processed and finally determined. The reference RSSI value X obtained by the above-mentioned method is incorporated in the device driver 61.

Returning to FIG. 5, the CPU 21 executes the device driver 61 to compare the absolute value of A−B with the reference RSSI value X (block 203). When the absolute value of A−B is larger than the reference RSSI value X, it is seen that there is the significant difference between A and B. Therefore, A and B are subsequently compared with each other (block 205). When A is larger, it is seen at this time that the transmission/reception circuit 51a is connected to the antenna 33a and the transmission/reception circuit 51b is not connected to the antenna 33b. Therefore, the absolute value of A−C is then compared with X (block 207). When the absolute value of A−C is larger than X, it is seen that there is the significant difference between A and C and the transmission/reception circuit 51c is not connected to the antenna 33c. Therefore, the CPU 21 sends a control signal to the transmission/reception control section 55 so as to validate the only transmission/reception circuit 51a (block 209, Case 4). When the absolute value of A−C is smaller than X, it is seen that there is not any significant difference between A and C and the transmission/reception circuit 51c is also connected to the antenna 33c. Therefore, the CPU 21 sends a control signal to the transmission/reception control section 55 so as to validate the transmission/reception circuits 51a and 51c (block 211, Case 3). It is to be noted that "Case n" (n=1 to 7) will be described later.

When B is larger in block 205, it is seen at this time that the transmission/reception circuit 51b is connected to the antenna 33b and the transmission/reception circuit 51a is not connected to the antenna 33a. Therefore, the absolute value of B-C is then compared with X (block 213). When the absolute value of B-C is larger than X, it is seen that there is the significant difference between B and C and the transmission/reception circuit 51c is not connected to the antenna 33c. Therefore, the CPU 21 sends a control signal to the transmission/reception control section 55 so as to validate the only transmission/reception circuit 51b (block 215, Case 6). When the absolute value of B-C is smaller than X, it is seen that there is not any significant difference between B and C and the transmission/reception circuit 51c is connected to the antenna 33c. Therefore, the CPU 21 sends a control signal to the transmission/reception control section 55 so as to validate the transmission/reception circuits 51b and 51c (block 217, Case 5).

When the absolute value of A−B is smaller than X in block 203, there is not any significant difference between A and B. Therefore, both the transmission/reception circuits 51a and 51b are connected or unconnected to the antennas 33a and 33b. Subsequently, the absolute value of A−C is then compared with X (block 219). In this case, since it is seen that there is not any significant difference between A and B, the absolute value of B−C may be compared with X. When the absolute value of A−C (or B−C) is larger than X, it is seen that there is the significant difference between a group of A and B and C. Therefore, A (or B) is then compared with C (block 221). When A (or B) is larger, it is seen that the transmission/reception circuits 51a and 51b are connected to the antennas 33a and 33b, respectively, and that the transmission/reception circuit 51c is not connected to the antenna 33c. In consequence, the device driver 61 sends a control signal to the transmission/reception control section 55 so as to validate the transmission/reception circuits 51a and 51b (block 223, Case 2). When C is larger in the block 221, it is seen that the transmission/reception circuit 51c is connected to the antenna 33c and that the transmission/reception circuits 51a and 51b are not connected to the antennas 33a and 33b. In consequence, the CPU 21 sends a control signal to the transmission/reception control section 55 so as to validate the only transmission/reception circuit 51c (block 225, Case 7).

When the absolute value of A−C (or B−C) is smaller than X in block 219, it is seen that there is not any significant difference between the group of A and B and C. Therefore, both the transmission/reception circuits 51a and 51b are connected or unconnected to the antennas. On the assumption that the wireless module 31 is connected to at least one antenna, it is judged that the transmission/reception circuits 51a, 51b and 51c are all connected to the antennas. Therefore, the CPU 21 sends a control signal to the transmission/reception control section 55 so as to validate all of the three transmission/reception circuits (block 229, Case 1).

FIG. 7 shows settings of the wireless module 31 in Cases 1 to 7 judged according to the flow chart of FIG. 5. In FIG. 7, circles indicate that the corresponding transmission/reception circuit is set to be valid according to the procedure of FIG. 5, and crosses ("x") indicate that the corresponding transmission/reception circuit is set to be invalid. It has been described with reference to FIG. 3 that all of the three transmission/reception circuits 51a, 51b and 51c can perform transmission/reception, but one or two of the three transmission/reception circuits is sometimes a circuit for exclusive use in reception, depending on a type of the wireless module 31. Here, a wireless module in which the number of the transmittable circuits is m and the number of the receivable circuits is n is referred to as the "m×n system". When the wireless module 31 is a 3×3 system, all the three transmission/reception circuits 51a, 51b and 51c can perform transmission as well as reception. Therefore, in any of Cases 1 to 7 judged, the transmission and the reception can be performed, although the number of the antennas for use differs. However, by way of example, in a case where the transmission/reception circuits 51a and 51c can perform the transmission and the reception and the transmission/reception circuit 51b is for exclusive use in the reception at the wireless module 31 of the 2×2 system, Case 2 is judged to set the transmission/reception circuit 51c to be invalid. The transmission can then be performed by the only transmission/reception circuit 51a, and the reception can be performed by the transmission/reception circuits 51a and 51b, and hence the wireless module 31 operates as a 1×2 system. Furthermore, when Case 6 is judged to set the transmission/reception circuits 51a and 51c to be invalid in the wireless module of the same 2×3 system, the only transmission/reception circuit 51b becomes valid, but this transmission/reception circuit 51b can perform the only reception. Therefore, the wireless module 31 cannot perform the transmission/reception, and such a configuration is judged to be erroneous. In a case where any of the transmission/reception circuits can perform the only transmission or the only reception in this manner, the operation mode of the wireless module 31 is set in consideration of this situation. In the case of the error, an error message indicating that the communication cannot be performed is sent to the OS.

In the MIMO wireless communication system, it is a principle to use a plurality of antennas during the transmission/reception. In one embodiment this principle is not applied because the connected state of the antenna is judged based on the RSSI value detected by the transmission/reception circuit to set the wireless module, and the system is sometimes operated in each of modes of multiple input single output (MISO), single input multiple output (SIMO) and single input single output (SISO). The wireless module of the MIMO is usually constituted so as to operate even in the MISO, the SIMO or the SISO. Therefore, the embodiment of the present invention can be applied using such a wireless module. If a wireless module (that does not operate in an operation mode other than the MIMO) is used, and an inoperable state is generated in accordance with the number of the valid antennas or transmission/reception circuits, the notebook PC 1 may display an error state for a user.

Figure 8:
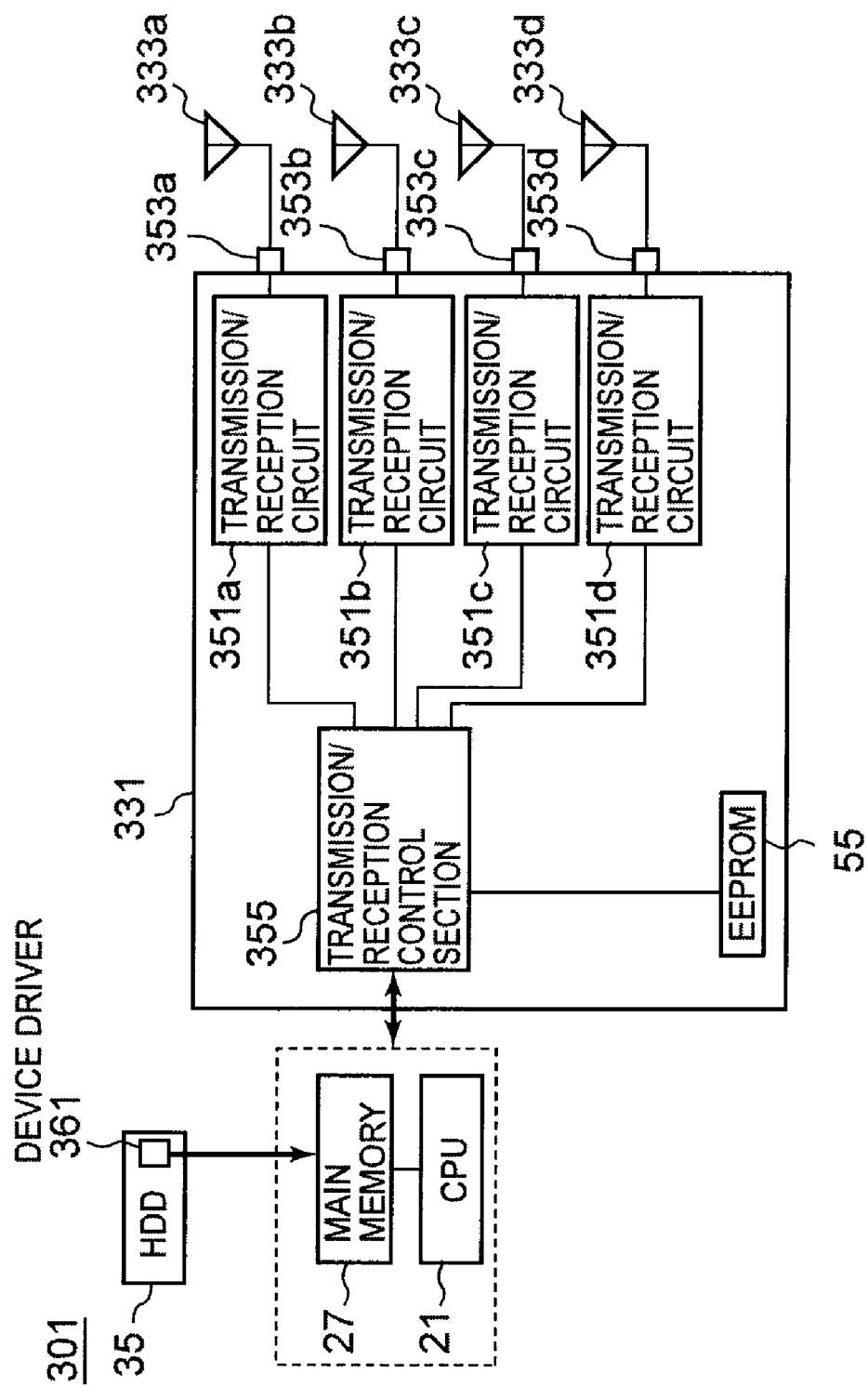
FIG. 8 is a schematic block diagram showing configurations of a wireless module, four antennas and a peripheral of a notebook PC according to another embodiment of the present invention.

FIG. 8 is a diagram showing a configuration of a notebook PC 301 according to another embodiment of the present invention. The configuration of the notebook PC 301 is substantially the same as that of the notebook PC 1, but is different in that a wireless module 331 which can be connected to four antennas 333a, 333b, 333c and 333d is incorporated, instead of the wireless module 31. The wireless module 331 mainly includes transmission/reception circuits 351a, 351b, 351c and 351d corresponding to the four antennas 333a, 333b, 333c and 333d, respectively, a transmission/reception control section 355 which controls these circuits, and an EEPROM 57 in which setting information on communication is stored. The four antennas 333a, 333b, 333c and 333d are connected to the transmission/reception circuits 351a, 351b, 351c and 351d via connectors 353a, 353b, 353c and 353d, respectively. Moreover, the transmission/reception control section 355 performs a function of distributing the transmission information to channels of the transmission/reception circuits, respectively, and a function of separating information of the channels from output signals received by the respective transmission/reception circuits to decode the information. The transmission/reception control section 355 can set whether to validate or invalidate the respective transmission/reception circuits. Furthermore, the transmission/reception control section 355 can set an operation mode of the section itself based on the number of the antennas for use. Moreover, in the notebook PC 301, a device driver 361 corresponding to the wireless module 331 is stored. Since the notebook PC 301 is the same as the notebook PC 1 described with reference to FIGS. 1 to 3 except the above-mentioned respects, the same reference numerals are used, and description thereof is omitted. Since a procedure to judge whether to validate or invalidate the respective transmission/reception circuits is the same as that of the flow chart shown in FIG. 4, description thereof is omitted.

Figure 9:
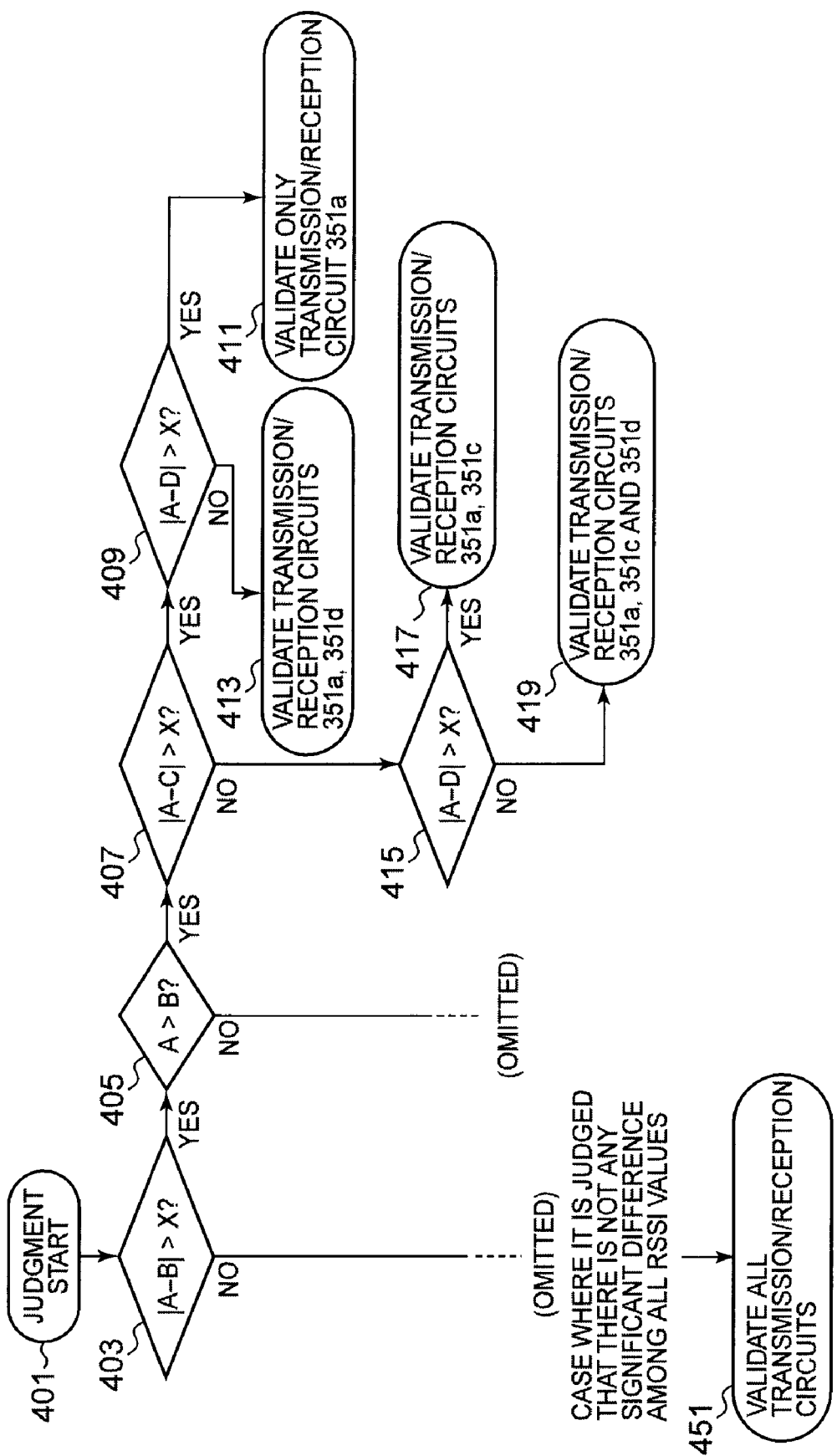
FIG. 9 is a flow chart showing judgment to determine whether or not to use the four antennas in the communication of the notebook PC according to another embodiment of the present invention.

FIG. 9 is a flow chart showing a procedure in which the notebook PC 301 sets the operation mode of the wireless module 331. A CPU 21 executes the device driver 361 to perform the procedure of FIG. 9. It is unclear whether or not the transmission/reception circuits 351a, 351b, 351c and 351d are effectively connected to the antennas 333a, 333b, 333c and 333d. When the CPU 21 acquires RSSI values from the respective transmission/reception circuits 351a, 351b, 351c and 351d (block 401), it is assumed in the following description that the RSSI values detected by the four transmission/reception circuits 351a, 351b, 351c and 351d are A, B, C and D, respectively. The CPU 21 first compares an absolute value of A–B with a reference RSSI value X (block 403). When the absolute value of A–B is larger than the reference RSSI value X, it is seen that there is a significant difference between A and B, and then A is compared with B to judge which is larger (block 405). When A is larger, it is seen at this time that the transmission/reception circuit 351a is connected to the antenna 333a and that the transmission/reception circuit 351b is not connected to the antenna 333b. Therefore, an absolute value of A–C is then compared with X (block 407). Furthermore, an absolute value of A–D is compared with X (block 409 or 415).

To judge whether or not the absolute value of A–C is larger than X means to judge whether or not there is a significant difference between A and C. This means that it is judged whether or not the transmission/reception circuit 351c is connected to the antenna 333c. Similarly, to judge whether or not the absolute value of A–D is larger than X means to judge whether or not there is a significant difference between A and D. This means that it is judged whether or not the transmission/reception circuit 351d is connected to the antenna 333d. In a case where it is judged that there is the significant difference between A and C and also between A and D, the CPU 21 sends a control signal to the transmission/reception control section 355 so as to validate the only transmission/reception circuit 351a (block 411). In a case where it is judged that there is the significant difference between A and C but there is not any significant difference between A and D, the CPU 21 sends a control signal to the transmission/reception control section 355 so as to validate the transmission/reception circuits 351a and 351d (block 413). In a case where it is judged that there is not any significant difference between A and C and that there is a significant difference between A and D, the CPU 21 sends a control signal to the transmission/reception control section 355 so as to validate the transmission/reception circuits 351a and 351c (block 417). In a case where it is judged that there is not any significant difference between A and C and between A and D, the CPU 21 sends a control signal to the transmission/reception control section 355 so as to validate the transmission/reception circuits 351a, 351c and 351d (block 419).

Subsequently, processing similar to that described up to the block 419 is repeated, and hence a middle part of the flow chart of FIG. 9 is omitted. Only when it is judged that there is not any significant difference among all of A, B, C and D, all of the transmission/reception circuits 351a, 351b, 351c and 351d is validated (block 451).

The method shown in the flow chart of FIG. 9 can similarly be extended, even if five or more antennas and transmission/reception circuits are used. FIG. 10 is a conceptual diagram showing a judgment method extended from the processing shown in FIGS. 5 and 9 in a case where r antennas and r transmission/reception circuits (r is an integer of 3 or more) are used. Processing is repeated in which the RSSI values of the respective transmission/reception circuits are compared with each other to judge whether or not there is a significant difference there between. In consequence, the transmission/reception circuits are usually divided into two groups. A first group 501 is a group of transmission/reception circuits 505 which have high RSSI values and in which it is judged that there is not any significant difference there between. A second group 503 is a group of transmission/reception circuits 507 which have low RSSI values and in which it is judged that there is not any significant difference there between. It is judged that there is a significant difference between the RSSI value of the arbitrary transmission/reception circuit belonging to the first group and the RSSI value of the arbitrary transmission/reception circuit belonging to the second group. Since the transmission/reception circuit 505 belonging to the first group is judged to be connected to the antenna, the circuit is validated. It is judged that the transmission/reception circuit 507 belonging to the second group is not connected to the antenna, and hence the circuit is invalidated.

Figure 10A:
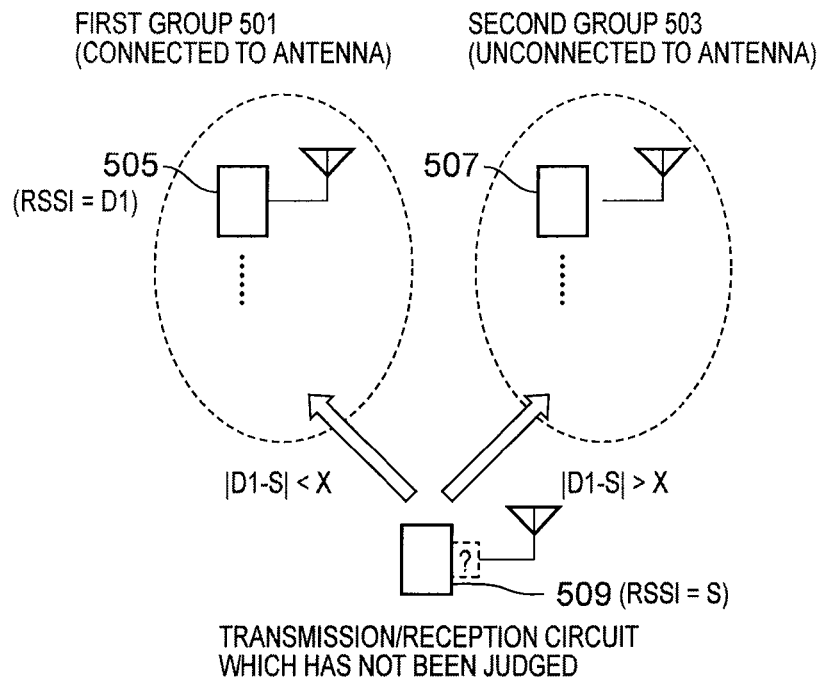
FIG. 10 is a conceptual diagram showing an extended judgment method of processing shown in FIGS. 5 and 9 in a case where r antennas and transmission/reception circuits (r is an integer of 3 or more) are used.

In a wireless module including r transmission/reception circuits as a whole, the RSSI values are compared with each other to evaluate s−1 (s is an integer and $3 \leq s \leq r$) transmission/reception circuits, and it is assumed that it has been judged that one or more transmission/reception circuits belong to each of the first and second groups. Here, it is assumed that an RSSI value of an s-th transmission/reception circuit 509, in which the evaluation based on the comparison of the RSSI values has not been completed, is S and that an RSSI value of the arbitrary transmission/reception circuit 505 belonging to the first group is D1. When an absolute value of D1−S is smaller than a reference RSSI value X, there is not any significant difference between S and D1, and therefore the s-th transmission/reception circuit belongs to the first group. When the absolute value of D1−S is larger than the reference RSSI value X, there is the significant difference between S and D1, and therefore the s-th transmission/reception circuit belongs to the second group. Subsequently, this processing is continued with respect to all of the transmission/reception circuits (FIG. 10A).

Figure 10B:
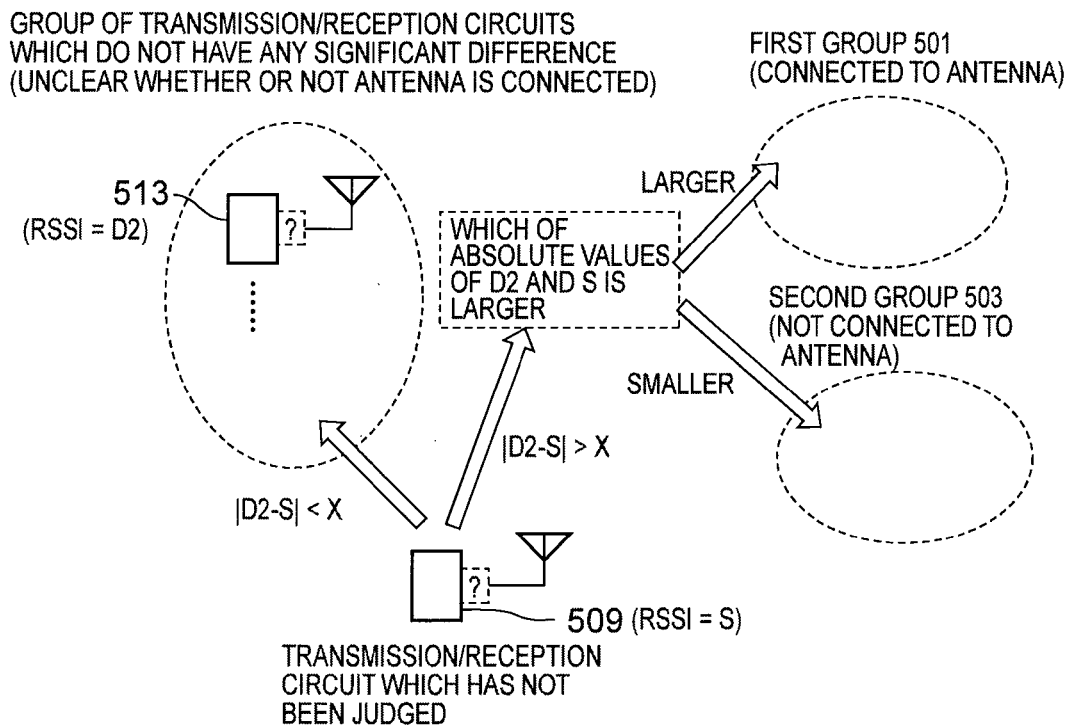
Figure 11:
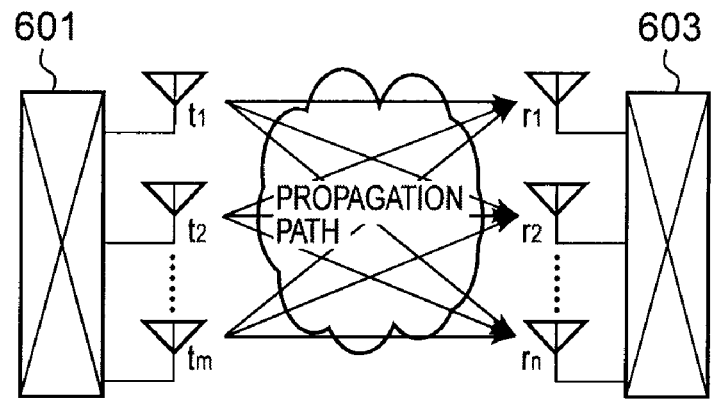
FIG. 11 is a conceptual diagram of an SDM technology by MIMO.
Figure 12:
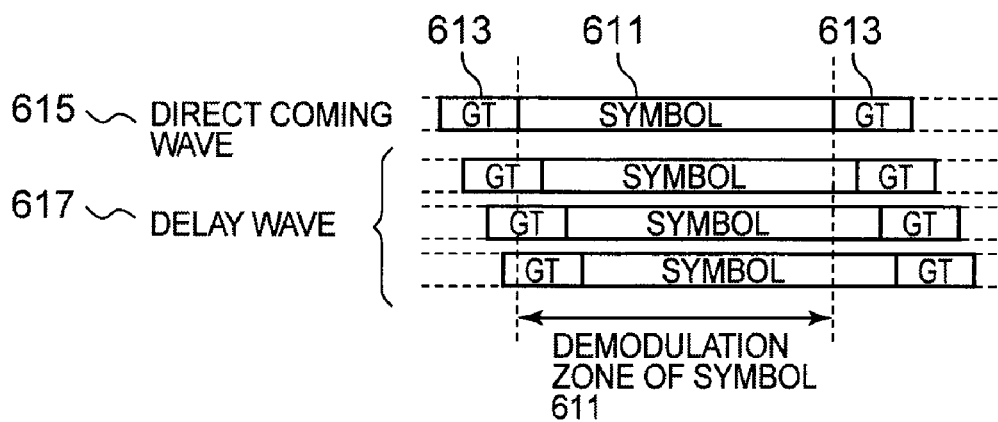
FIG. 12 is a conceptual diagram of an OFDM technology.

Even when s−1 transmission/reception circuits are evaluated by the comparison of the RSSI values, there is not any significant difference among all of the circuits. Therefore, the first group 501 or the second group 503 is only formed, and it sometimes cannot be judged whether or not the transmission/reception circuit of the group is connected to the antenna. In this case, assuming that an RSSI value of an arbitrary transmission/reception circuit 513 included in a group 511 of s−1 transmission/reception circuits among which there is not any significant difference is D2, the value is compared with an RSSI value S of an s-th transmission/reception circuit 509. When an absolute value of D2−S is smaller than the reference RSSI value X, the s-th transmission/reception circuit does not have any significant difference, and is therefore included in the same group 511 as that of s−1 transmission/reception circuits. When s<r, even an s+1-th transmission/reception circuit is similarly judged. When the absolute value of D2−S is larger than the reference RSSI value X, there is the significant difference between S and D2. When the absolute value of D2−S is larger than the reference RSSI value X, and D2 is larger as a result of the comparison of S with D2, it is assumed that a group of s−1 transmission/reception circuits is the first group 501 and that the s-th transmission/reception circuit belongs to the second group 503. When the absolute value of S−D2 is larger than the reference RSSI value, X and S is larger as a result of comparison of S with D2, it is assumed that the s-th transmission/reception circuit belongs to the first group 501, and that the group of the s−1 transmission/reception circuits is the second group 503. Here, since the s transmission/reception circuits are first divided into the first group 501 and the second group 503, processing shown in FIG. 10A is subsequently performed with respect to all of the remaining transmission/reception circuits (FIG. 10B).

Even if the above-mentioned processing is repeated with respect to all of the transmission/reception circuits, it is judged that there is not any significant difference among all of the transmission/reception circuits. In this case, on the assumption that at least one transmission/reception circuit is effectively connected to the antenna, all of the transmission/reception circuits are validated. Since this processing is similar to that described in the block 277 of FIG. 5 or the block 451 of FIG. 9, detailed description thereof is omitted. Based on the presence of the significant difference between the transmission/reception circuits judged as described above, the CPU 21 executes the device driver 361 to send the control signal to the transmission/reception control section 355, sets the transmission/reception circuit belonging to the first group to be valid, and sets the transmission/reception circuit belonging to the second group to be invalid.

In addition, as shown in FIG. 4, after the OS and the device driver are started, the connected situations of the antennas are judged based on the RSSI values detected by the transmission/reception circuits, the configuration of the wireless module is set according to the result, and the communication is started. To judge whether or not the antenna is connected is a physical factor. Therefore, there is little possibility that the factor changes every time the OS starts. However, on a special receiving condition of a wireless wave, for example when a transmission-side output is small, the transmission-side antenna is disposed distant from the reception-side antenna or there are many obstacles, the RSSI value is entirely reduced or largely fluctuates sometimes. Even in the above-mentioned method, there is a possibility that a wrong judgment is made. To solve the problem, every time the communication is started, the connected situation of the antenna is judged and the operation of setting the wireless module is performed. In this case, even after the wireless module is set based on such a wrong judgment, it can be expected that the module is correctly set when the communication is performed next. The wireless module itself does not have setting information other than the three-antenna mode of the default, and the valid connected situation of the antenna is judged and set by the device driver. When such a configuration according to the present embodiment is employed, one wireless module can cope with both of the two-antenna mode and the three-antenna mode. There is a further merit in that the wireless module can be used in common and mounted on a plurality of types of notebook PCs. This is convenient in a case where at least about five types of wireless modules need to be prepared with respect to one model, because costs required for storing components for replacement are reduced.

It is to be further noted that the specific illustrated embodiments have been explained in the present invention, but the present invention is not restricted to the foregoing illustrated and described embodiments, and it should be readily understood that any known structure can be adopted as long as the effects of the present invention can be demonstrated. Thus, the present invention has been described while referring to the specific embodiments illustrated in the drawings. However, the present invention is not limited to these embodiments, and of course, so long as the effects provided by the present invention are obtained, any kind of well known configuration can be employed.

It is to be understood that the present invention, in accordance with at least one presently preferred embodiment, includes elements that may be implemented on at least one general purpose computer running suitable software programs. These may also be implemented on at least one integrated circuit or part of at least one integrated circuit. Thus, it is to be understood that the invention may be implemented in hardware, software, or a combination of both.

If not otherwise stated herein, it is to be assumed that all patents, applications, patent publications and other publications (including web-based publications) mentioned cited herein are hereby fully incorporated by reference as if fully set forth in their entirety herein.

What is claimed is:

1. A method comprising:
in a MIMO wireless communication system, detecting a plurality of received signal strength indicator values from a plurality of receiving circuits;
determining if there is a significant difference between the plurality of received signal strength indicator values from the plurality of receiving circuits indicating that one or more of the plurality of receiving circuits is not connected to an antenna via performing one or more of:
comparing a received signal strength indicator value with a received signal strength indicator value of one or more receiving circuits known to be connected to an antenna; and
comparing a received signal strength indicator value with previously a previously measured reference value representative of a not connected state; and
responsive to determining the significant difference:
recognizing that a receiving circuit from which a smaller received signal strength indicator value has been detected is not connected to at least one of the plurality of antennas; and
setting to operation stop the receiving circuit recognized to be not connected to at least one of a plurality of antennas.

2. The method according to claim 1, wherein the step of determining if there is a significant difference via comparing a received signal strength indicator value with a previously measured reference value representative of a not connected state further comprises:
comparing a difference between a first received signal strength indicator value and a second received signal strength indicator value with the previously measured reference received signal strength indicator value, wherein there is a significant difference if said previously measured reference value is smaller than said difference between said first received signal strength indicator value and said second received signal strength indicator value.

3. The method according to claim 2, wherein the previously measured reference value representative of a not connected state comprises:
a value that is larger than a value representing a difference between a representative value of received signal strength indicator values detected a plurality of times from one receiving circuit connected to at least one of a plurality of antennas and a representative value of received signal strength indicator values detected a plurality of times from another receiving circuit connected to at least one of the plurality of antennas, and smaller than a value representing a difference between the value of the received signal strength indicator values detected the plurality of times from the one receiving circuit connected to at least one of a plurality of antennas and a representative value of received signal strength indicator values detected a plurality of times from another receiving circuit which is not connected to at least one of the plurality of antennas.

4. The method according to claim 1, wherein determining if there is a significant difference via comparing a received signal strength indicator value with a received signal strength indicator value of one or more receiving circuits known to be connected to an antenna further comprises:
determining if there is a significant difference between a representative received signal strength indicator value, detected from one receiving circuit selected form a plurality of receiving circuits for which the received signal strength indicator values do not have the significant difference there between, and a target received signal strength indicator value.

5. The method according to claim 4, wherein the step of recognizing further comprises:
   if the significant difference is determined between the representative received signal strength indicator value and the target value, ascertaining that the one receiving circuit selected form a plurality of receiving circuits is connected to at least one of the plurality of antennas if the representative received signal strength indicator value is large as compared to the target value.

6. The method according to claim 4, wherein when there is not a significant difference between the representative received signal strength indicator value and the target value, the step of determining the significant difference further comprises:
   including the receiving circuit from which the target received signal strength indicator value has been detected in the plurality of receiving circuits to perform the determination.

7. The method according to claim 1 further comprising:
   determining if there is a difference between a first, a second, and a third received signal strength indicator values from a first, a second, and a third receiving circuit; and
   recognizing the receiving circuit which is not connected to at least one of the plurality of antennas by utilizing a reference received signal strength indicator value.

8. The method according to claim 7, wherein the reference received signal strength indicator value comprises:
   an intermediate value between a reference not connected value and a reference connected value.

9. The method according to claim 7, wherein the recognizing the receiving circuit which is not connected further comprises:
   recognizing that a receiving circuit from which a larger received signal strength indicator value has been detected is connected to at least one of a plurality of antennas when an absolute value of a difference between a first received signal strength indicator value detected from a first receiving circuit and a second received signal strength indicator value detected from a second receiving circuit is larger than the reference received signal strength indicator value.

10. The method according to claim 9, wherein the recognizing the receiving circuit which is not connected step further comprises:
    recognizing that the receiving circuit from which the larger received signal strength indicator value has been detected and the third receiving circuit are connected to the at least one of the plurality of antennas when an absolute value of a difference between the larger received signal strength indicator value and the third received signal strength indicator value detected from the third receiving circuit is smaller than the reference received signal strength indicator value.

11. The method according to claim 7, wherein the recognizing the receiving circuit which is not connected step further comprises:
    comparing, with the reference received signal strength indicator value, an absolute value of a difference between the first received signal strength indicator value, or the second received signal strength indicator value, and the third received signal strength indicator value detected from the third receiving circuit when an absolute value of a difference between the first received signal strength indicator value detected from the first receiving circuit and the second received signal strength indicator value detected from the second receiving circuit is smaller than the reference received signal strength indicator value.

12. The method according to claim 11, wherein the recognizing the receiving circuit which is not connected step further comprises:
    recognizing that the third receiving circuit is connected to the at least one of a plurality of antennas when the absolute value of a difference between the first received signal strength indicator value, or the second received signal strength indicator value, and the third received signal strength indicator value is larger than the reference received signal strength indicator value and the first received signal strength indicator value or the second received signal strength indicator value is smaller than the third received signal strength indicator value.

13. The method according to claim 11, wherein the recognizing the receiving circuit which is not connected step further comprises:
    recognizing that the first receiving circuit, the second receiving circuit and the third receiving circuit are connected to the at least one of the plurality of antennas when the absolute value of the difference between the first received signal strength indicator value, or the second received signal strength indicator value, and the third received signal strength indicator value is smaller than the reference received signal strength indicator value.

14. An apparatus comprising:
    a plurality of antennas;
    a MIMO wireless communication module, including a plurality of receiving circuits, configured to be connected to the plurality of antennas and configured to detect a plurality of received signal strength indicator values from the plurality of receiving circuits;
    an arrangement configured to determine if there is a significant difference between the plurality of received signal strength indicator values from the plurality of receiving circuits indicating that one or more of the plurality of receiving circuits is not connected to an antenna via performing one or more of:
    comparing a received signal strength indicator value with a received signal strength indicator value of one or more receiving circuits know to be connected to an antenna; and
    comparing a received signal strength indicator value with a previously measured reference value representative of a not connected state; and
    an arrangement configured to, responsive to determining the significant difference:
    recognize that a receiving circuit from which a smaller received signal strength indicator value has been detected is not connected to at least one of the plurality of antennas, and
    set to operation stop the receiving circuit recognized to be not connected to at least one of a plurality of antennas.

15. The apparatus according to claim 14, wherein the MIMO wireless communication module conforms to IEEE802.11n.

16. The apparatus according to claim 14, wherein the recognition arrangement recognizes a significant difference between the first received signal strength indicator value and the second received signal strength indicator value by way of comparison with the previously measured reference value.

17. An apparatus comprising:
a storage device in which a communication program and a reference received signal strength indicator value are stored;
a plurality of antennas;
a MIMO wireless communication system including a plurality of receiving circuits configured to be connected to the plurality of antennas via a connector, and configured to detect received signal strength indicator values from the receiving circuits; and
a processor which executes the communication program and which judges whether there is a significant difference between the received signal strength indicator values detected from the plurality of receiving circuits indicating that one or more of the plurality of receiving circuits is not connected to an antenna to recognize a receiving circuit which is not connected to an antenna;
wherein to judge if there is a significant difference further comprises performing one or more of:
comparing a received signal strength indicator value with a received signal strength indicator value of one or more receiving circuits known to be connected to an antenna; and
comparing a received signal strength indicator value with a previously measured reference value representative of a not connected state;
responsive to determining the significant difference, said processor being configured to:
recognize that a receiving circuit from which a smaller signal strength indicator value has been detected is not connected to at least one of the plurality of antennas; and
set the recognized receiving circuit to operation stop.

18. The apparatus according to claim 17, wherein the processor executes the communication program before the computer starts a wireless communication for each connecting operation of the wireless communication.

19. A non-signal program storage device readable by machine embodying a program of instructions executable by the machine to perform steps comprising:
in a MIMO wireless communication system, detecting a plurality of received signal strength indicator values from a plurality of receiving circuits;
determining if there is a significant difference between the plurality of received signal strength indicator values from the plurality of receiving circuits indicating that one or more of the plurality of receiving circuits is not connected to an antenna via performing one or more of:
comparing a received signal strength indicator value with a received signal strength indicator value of one or more receiving circuits known to be connected to an antenna; and
comparing a received signal strength indicator value with previously a previously measured reference value representative of a not connected state; and
responsive to determining the significant difference:
recognizing that a receiving circuit from which a smaller received signal strength indicator value has been detected is not connected to at least one of the plurality of antennas; and
setting to operation stop the receiving circuit recognized to be not connected to at least one of a plurality of antennas.

20. The non-signal program storage device according to claim 19, wherein the step of determining if there is a significant difference via comparing a received signal strength indicator value with a previously measured reference value representative of a not connected state further comprises:
comparing a difference between a first received signal strength indicator value and a second received signal strength indicator value with the previously measured reference received signal strength indicator value, wherein there is a significant difference if said previously measured reference value is smaller than said difference between said first received signal strength indicator value and said second received signal strength indicator value.

* * * * *